(12) United States Patent
Collett et al.

(10) Patent No.: US 11,995,947 B2
(45) Date of Patent: May 28, 2024

(54) SYSTEM AND METHOD FOR CREATING A PLURALITY OF DIFFERENT VIDEO PRESENTATIONS THAT SIMULATE A BROADCASTED GAME OF CHANCE

(71) Applicant: Inspired Gaming (UK) Limited, Staffordshire (GB)

(72) Inventors: Steven Collett, Burton upon Trent (GB); Simon R. Twigg, Bangor (GB); Steven B. Davies, North Wales (GB)

(73) Assignee: INSPIRED GAMING (UK) LIMITED, Staffordshire (GB)

( * ) Notice: Subject to any disclaimer, the term of this patent is extended or adjusted under 35 U.S.C. 154(b) by 0 days.

(21) Appl. No.: 18/117,628

(22) Filed: Mar. 6, 2023

(65) Prior Publication Data
US 2023/0368601 A1    Nov. 16, 2023

Related U.S. Application Data

(63) Continuation of application No. PCT/IB2022/058784, filed on Sep. 16, 2022.
(Continued)

(51) Int. Cl.
*G07F 17/32* (2006.01)
*H04N 5/265* (2006.01)

(52) U.S. Cl.
CPC ...... *G07F 17/3213* (2013.01); *G07F 17/3288* (2013.01); *H04N 5/265* (2013.01)

(58) Field of Classification Search
CPC .. G07F 17/3213; G07F 17/3288; H04N 5/265
See application file for complete search history.

(56) References Cited

U.S. PATENT DOCUMENTS 4,582,324 A     4/1986  Koza et al.
8,608,560 B1 *  12/2013  Perrone ............... G07F 17/3211
                                                    463/31
(Continued)

FOREIGN PATENT DOCUMENTS

JP    2018520772 A    8/2018
KR    20180124084 A   11/2018
WO    2017004433 A1   1/2017

OTHER PUBLICATIONS

International Search Report with Written Opinion dated Feb. 2, 2023 in PCT Application No. PCT/IB2022/058784.

*Primary Examiner* — James S. McClellan
*Assistant Examiner* — Ross A Williams
(74) *Attorney, Agent, or Firm* — Panitch Schwarze Belisario & Nadel LLP

(57) ABSTRACT

An apparatus and method are provided for creating a plurality of different video presentations that simulate a broadcasted game of chance. The game of chance has a plurality of successive stages, including a betting stage during which players enter bets for the game of chance, and a game play stage. The game play stage begins at the end of the betting stage and ends with a game outcome. A memory stores a plurality of video fragments associated with a game of chance. The video fragments include a first set of video fragments that are associated with the betting stage, and a second set of video fragments that are associated with the game play stage. At least some of the video fragments have a plurality of different video takes that represent the same video fragment. The second set of video fragments include a game outcome video fragment. The game outcome video fragment includes a plurality of different video takes that represent different game outcomes. A controller creates a first seamless, ordered string of stitched video fragments using the first set of video fragments for presentation to players during the betting stage. The first set of video fragments are selected using a Random Number Generator (RNG), the RNG being used to select one of the video takes for each of the first set of video fragments that have a
(Continued)

plurality of different video takes that represent the same video fragment. Upon conclusion of the betting stage, the RNG is used to select the outcome of the game. The outcome of the game is thereby not known during the betting stage. The controller creates a second seamless, ordered string of stitched video fragments using the second set of video fragments for presentation to players during the game play stage. The second set of video fragments are also selected using the Random Number Generator (RNG), the RNG being used to select one of the video takes for each of the second set of video fragments that have a plurality of different video takes that represent the same video fragment. The video take that is selected for the video fragment associated with the game outcome is determined by the RNG which selected the outcome of the game. The controller combines the first and second seamless, ordered string of stitched video fragments to provide the video presentation that simulates the broadcasted game of chance.

12 Claims, 18 Drawing Sheets

Related U.S. Application Data

(60) Provisional application No. 63/340,664, filed on May 11, 2022.

(56) References Cited

U.S. PATENT DOCUMENTS

| | | |
|---|---|---|
| 9,426,543 B1 | 8/2016 | Li et al. |
| 9,451,180 B2 | 9/2016 | Mo et al. |
| 10,210,700 B2 | 2/2019 | Metelko et al. |
| 10,322,339 B2 | 6/2019 | Metelko et al. |
| 2003/0027621 A1* | 2/2003 | Libby .............. A63F 13/12 463/17 |
| 2003/0087683 A1* | 5/2003 | Gatto .............. G06Q 50/34 463/6 |
| 2008/0274798 A1 | 11/2008 | Walker et al. |
| 2009/0208181 A1 | 8/2009 | Cottrell |
| 2013/0029741 A1 | 1/2013 | Kuhn |
| 2014/0101551 A1 | 4/2014 | Sherrets et al. |
| 2016/0059135 A1* | 3/2016 | Wright .............. A63F 13/537 463/31 |
| 2017/0072309 A1 | 3/2017 | Perry et al. |
| 2018/0330574 A1* | 11/2018 | Wright .............. G07F 17/3225 |
| 2020/0066090 A1* | 2/2020 | Green .............. G07F 17/3209 |
| 2021/0258485 A1 | 8/2021 | Cheng et al. |
| 2021/0327220 A1 | 10/2021 | Paradise |
| 2021/0352362 A1* | 11/2021 | Moore .............. G11B 27/031 |

* cited by examiner

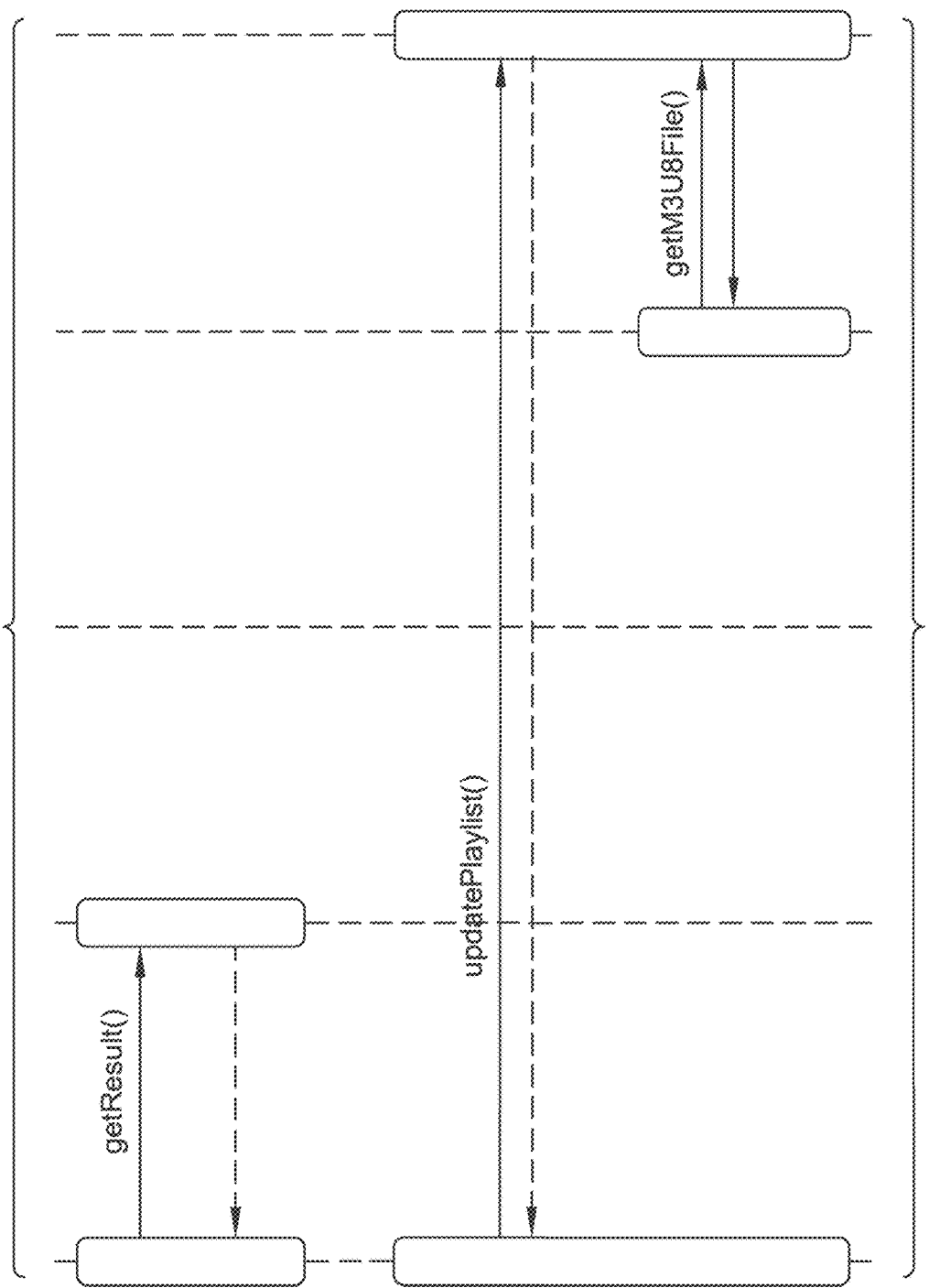

Fig. 3D

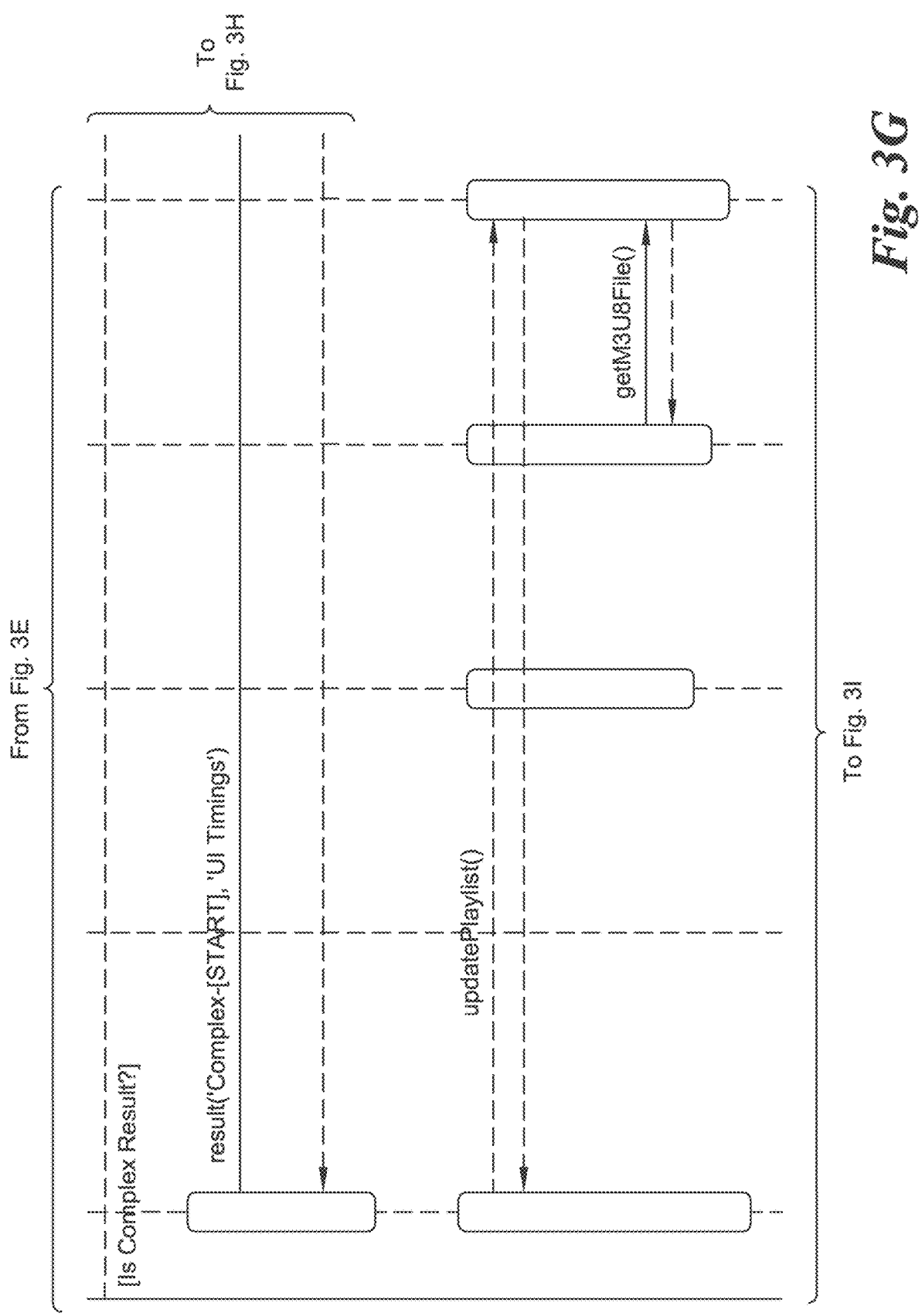

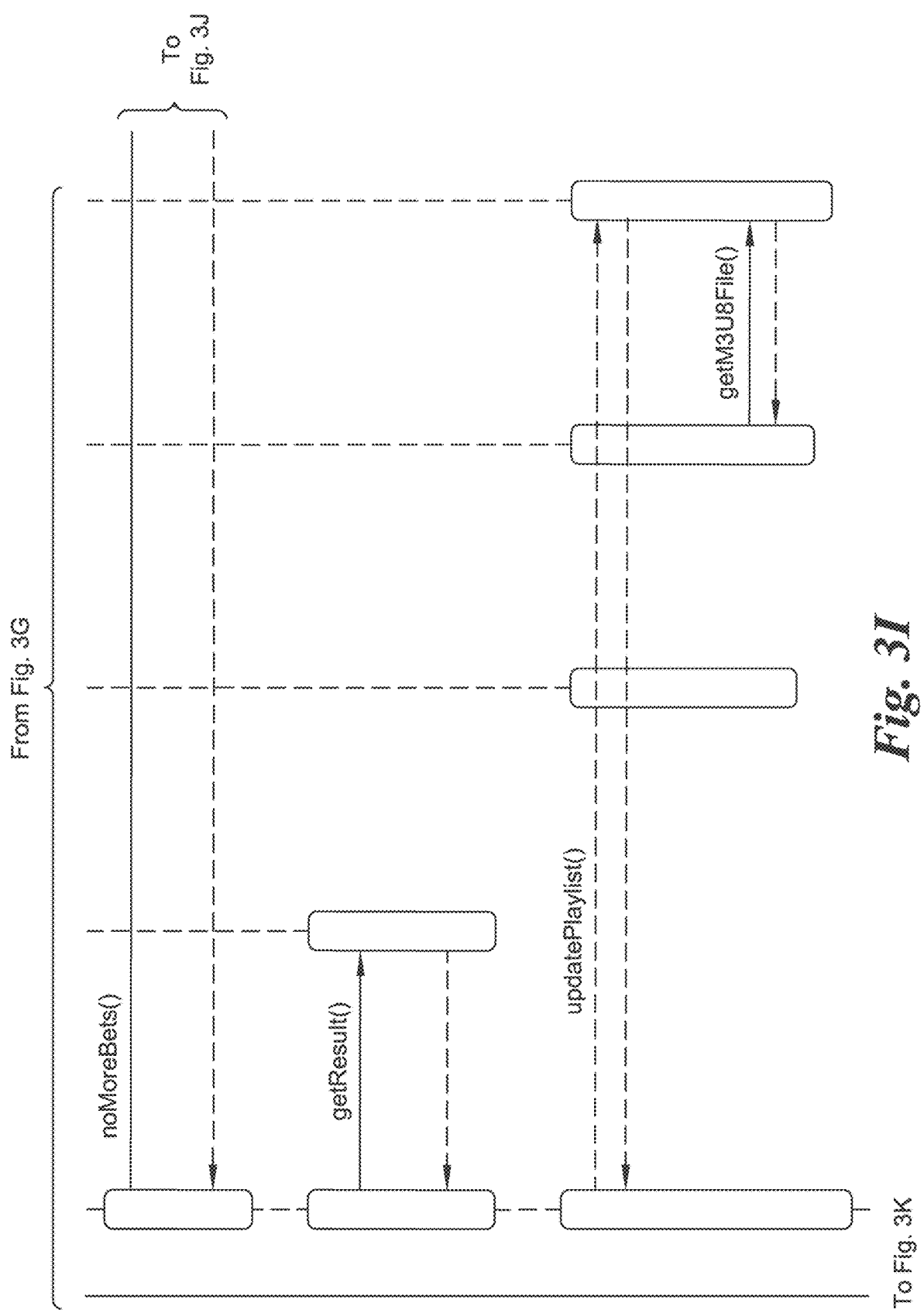

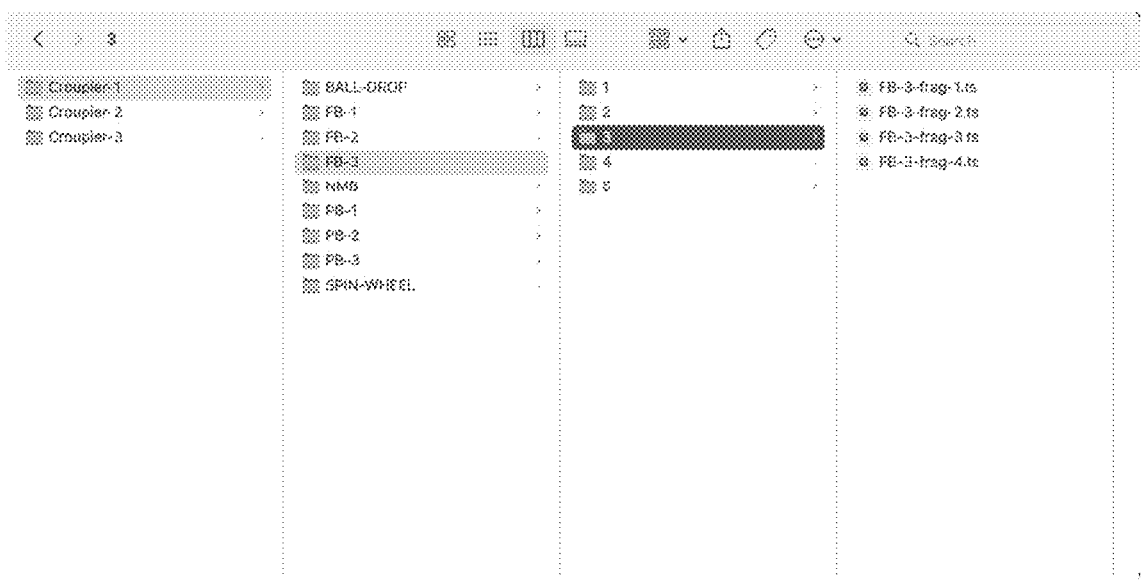
Figure 4 - Example file system layout 1

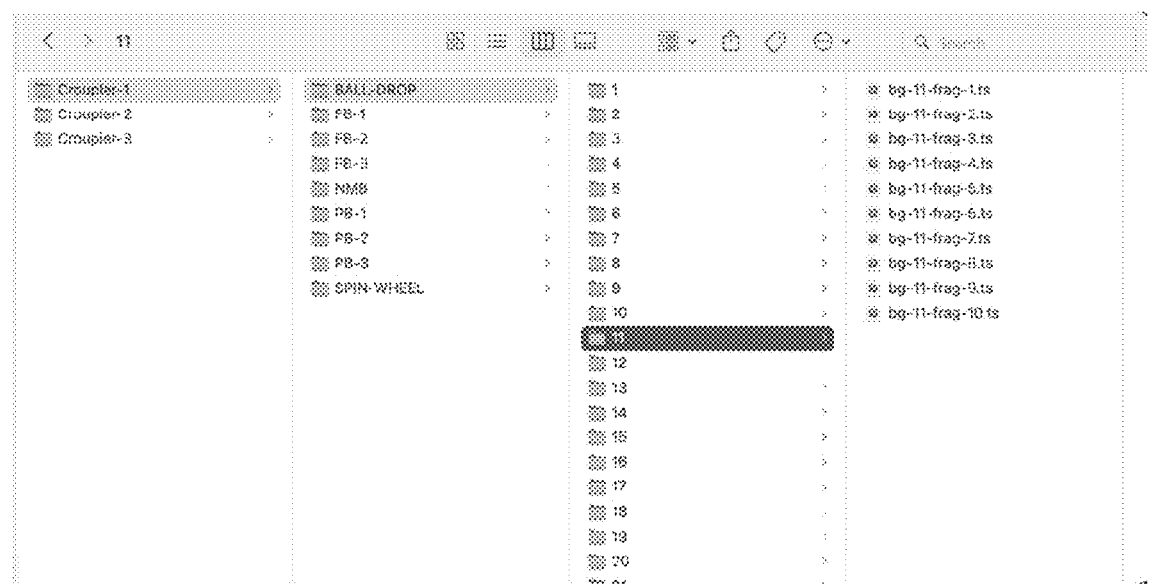
Figure 5 - Example File system Layout 2

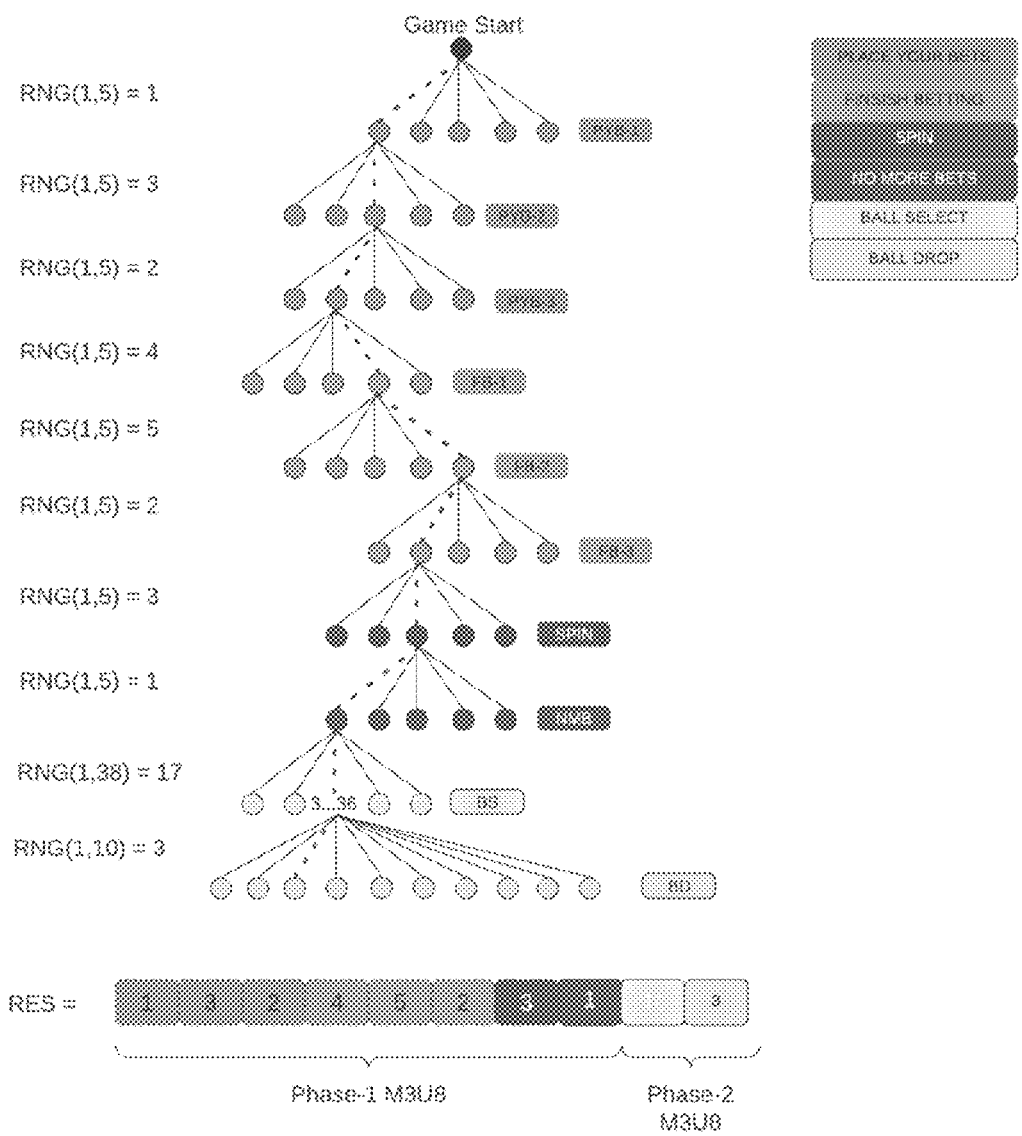
Figure 6 - Decision Tree for M3U8 Assembly

SYSTEM AND METHOD FOR CREATING A PLURALITY OF DIFFERENT VIDEO PRESENTATIONS THAT SIMULATE A BROADCASTED GAME OF CHANCE

CROSS-REFERENCE TO RELATED APPLICATIONS

This application is a bypass continuation of copending PCT International Application No. PCT/IB2022/058784 filed Sep. 16, 2022, which is incorporated by reference herein.

This application claims priority to U.S. Provisional Patent Application No. 63/400,790 filed May 11, 2022, which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Gaming venues are aggressively branching out from offering primarily live game play (which can be experienced either in person or via a broadcast to the player's remote location) to completely virtual or simulated game play with remotely located players. However, it is challenging to achieve the look-and-feel of live game play in a virtual or simulated environment. The present invention addresses this challenge by providing a gaming platform that provides a video presentation that simulates a broadcasted game of chance.

BRIEF DESCRIPTION OF THE DRAWINGS

Preferred embodiments of the present invention will now be described by way of example with reference to the accompanying drawings:

Figure 3D:
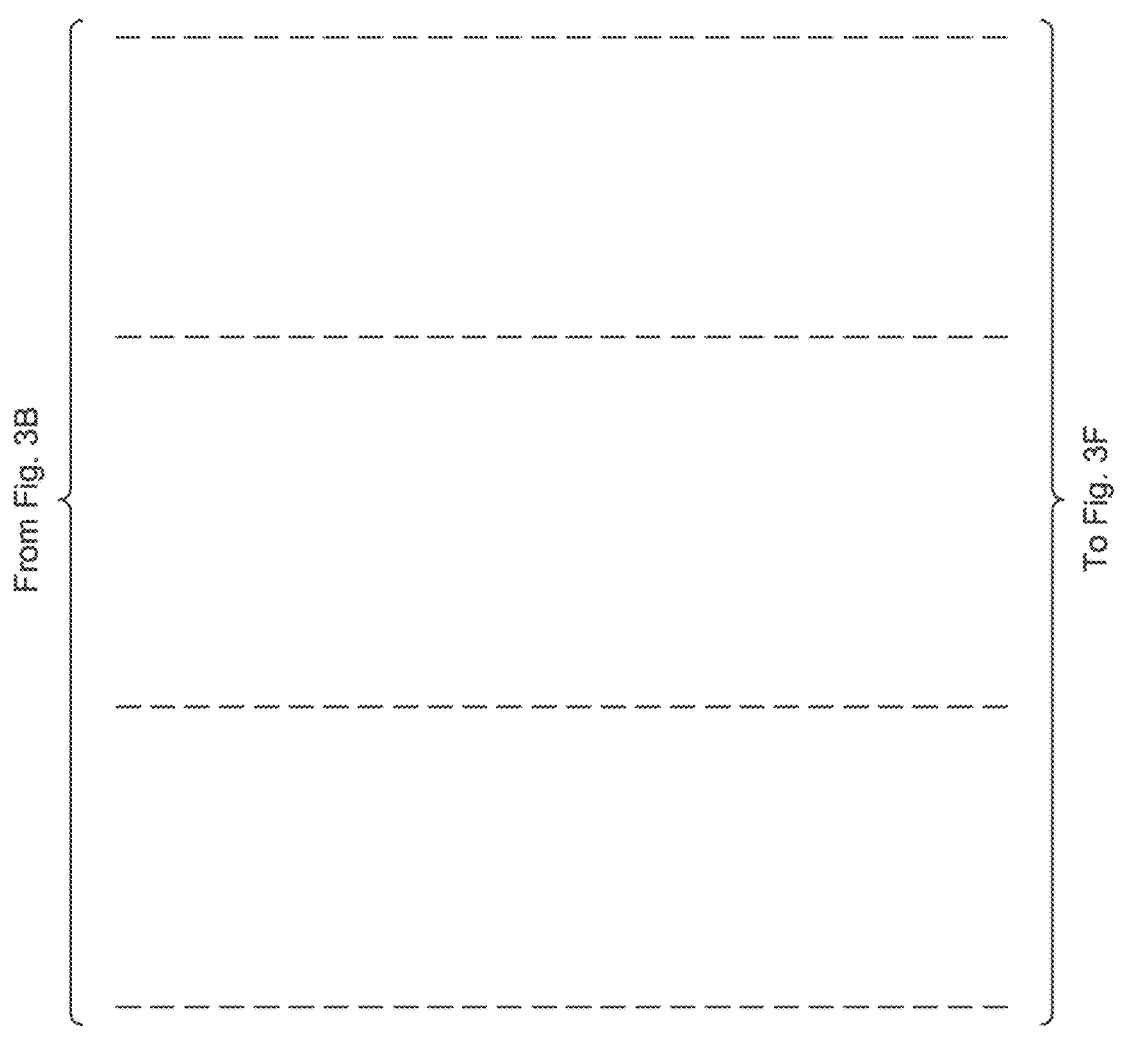

FIGS. 3 and FIGS. 3A-3L, taken together, show a self-explanatory sequence diagram for a game of chance referred to as "Spin City."

FIGS. 4 and 5 show two different views of a sample media filesystem structure.

FIG. 6 is a sample decision tree that shows how an m3u8 file is assembled based on a random selection through the decision tree.

SUMMARY OF THE PRESENT INVENTION

Figure 1:
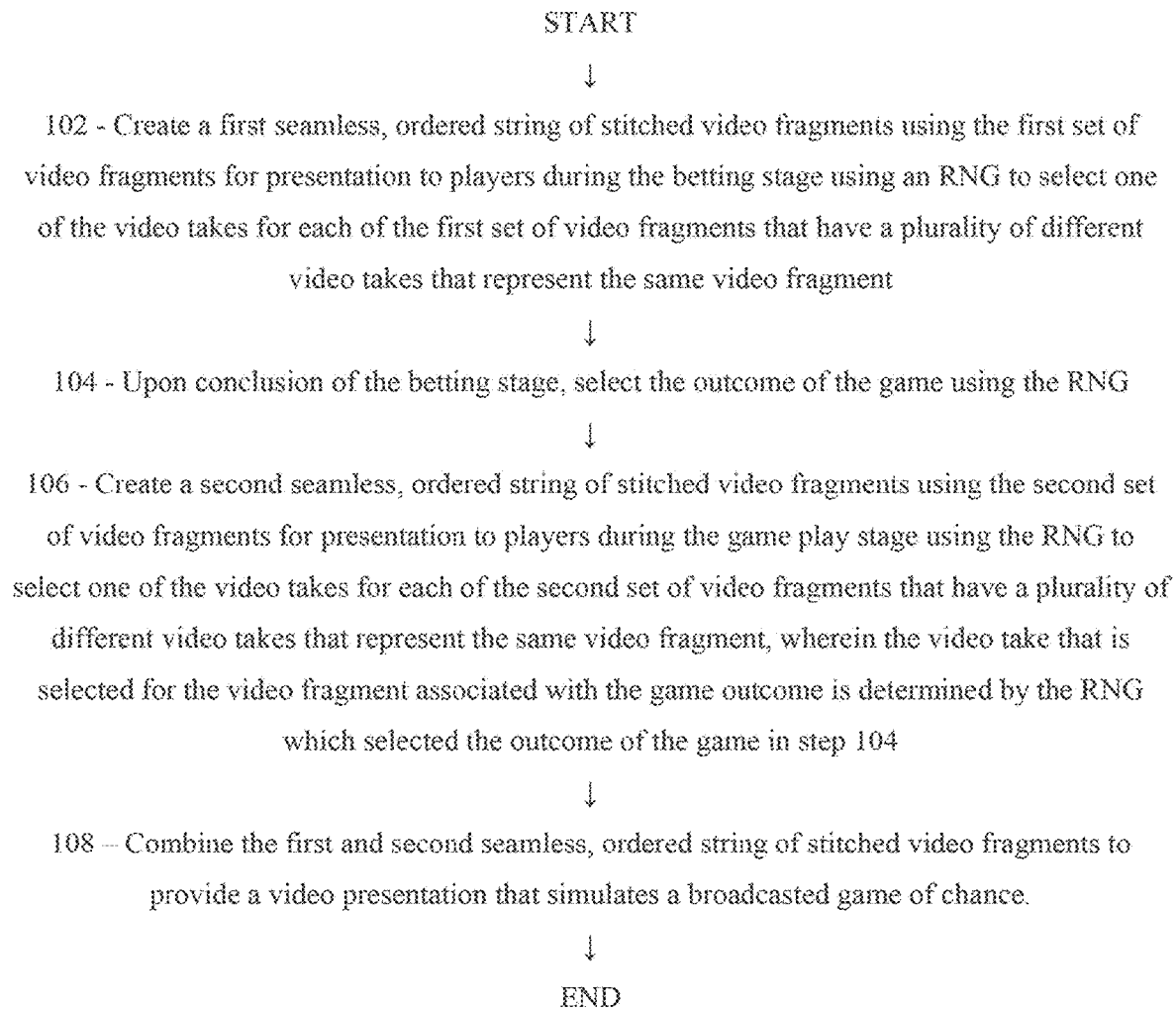
FIG. 1 is a flowchart of one preferred embodiment of the present invention.

An apparatus and method are provided for creating a plurality of different video presentations that simulate a broadcasted game of chance. The game of chance has a plurality of successive stages, including a betting stage during which players enter bets for the game of chance, and a game play stage. The game play stage begins at the end of the betting stage and ends with a game outcome. A memory stores a plurality of video fragments associated with a game of chance. The video fragments include a first set of video fragments that are associated with the betting stage, and a second set of video fragments that are associated with the game play stage. At least some of the video fragments have a plurality of different video takes that represent the same video fragment. The second set of video fragments include a game outcome video fragment. The game outcome video fragment includes a plurality of different video takes that represent different game outcomes. A controller creates a first seamless, ordered string of stitched video fragments using the first set of video fragments for presentation to players during the betting stage. The first set of video fragments are selected using a Random Number Generator (RNG), the RNG being used to select one of the video takes for each of the first set of video fragments that have a plurality of different video takes that represent the same video fragment. Upon conclusion of the betting stage, the RNG is used to select the outcome of the game. The outcome of the game is thereby not known during the betting stage. The controller creates a second seamless, ordered string of stitched video fragments using the second set of video fragments for presentation to players during the game play stage. The second set of video fragments are also selected using the Random Number Generator (RNG), the RNG being used to select one of the video takes for each of the second set of video fragments that have a plurality of different video takes that represent the same video fragment. The video take that is selected for the video fragment associated with the game outcome is determined by the RNG which selected the outcome of the game. The controller combines the first and second seamless, ordered string of stitched video fragments to provide the video presentation that simulates the broadcasted game of chance.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

One preferred embodiment of the present invention is implemented via software code shown below. The software code is subject to the "Copyright Notice and Authorization" stated above.

This patent application includes an Appendix provided below. The Appendix is incorporated by reference into the present patent application. One preferred embodiment of the present invention is implemented via the source code in the Appendix. The Appendix is subject to the "Copyright Notice and Authorization" stated above.

The Appendix includes the following parts of software code:

Part 1—Sample source code that demonstrates how a m3u8 file is assembled using the RNG to randomize the fragment selection Part 2—Actual m3u8 file generated from code in Part 1

I. TERMINOLOGY AND DEFINITIONS

The following terminology and definitions are provided to promote understanding of the present invention. The terminology and definitions of the prior art are not necessarily consistent with the terminology and definitions of the present invention. Where there is conflict, the following terminology and definitions apply.

video take—A video take is a video clip of a portion of a scene wherein the same scene is recorded (filmed) multiple times, thereby generating a plurality of takes (e.g., take 1, take 2). Each scene is then broken up into a plurality of video fragments. Accordingly, at least some of the video fragments have a plurality of different video takes that represent the same video fragment. This is analogous to "takes" when filming a movie. The script (dialogue) and movement and interaction of the actors and background scenery will generally be the same, but will differ in subtle or significant ways from each other. The director then decides which take will be used in the final assembly of the movie. Portions of different takes may be mixed and matched to assemble the same scene. At least some of the video takes are real-world recorded video.

game outcome video fragment (also, game result video fragment)—The game outcome video fragment includes a plurality of different video takes that represent different game outcomes (results). For example, if the game of chance is a spinning wheel game, the game outcome will be the prize that the spinning wheel lands on, and thus the game outcome video fragment will be a video of the spinning wheel landing on a specific prize. Accordingly, if the wheel is divided into 20 prize areas, there will be at least 20 different game outcome video fragments. There may even be multiple different game outcome video fragments for the same game outcome (result) because the spinning wheel does not always finish its motion the exact same time when it lands on a specific prize. If the game of chance is roulette, the game outcome will be the numbered compartment that the ball drops into when coming to a rest.

II. OVERVIEW

Methods and systems are provided for creating a plurality of different video presentations that simulate a broadcasted game of chance. The game of chance has a plurality of successive stages, including at least (i) a betting stage, and (ii) a game play stage. During the betting stage, players enter bets for the game of chance. The game play stage begins at the end of the betting stage and ends with a game outcome (game result). In operation, and referring to flowchart 100 shown in FIG. 1, the process operates as follows:

1. A plurality of video fragments associated with a game of chance are stored in a memory (also, interchangeably referred to herein as a "video store"). The video fragments include a first set of video fragments that are associated with the betting stage, and a second set of video fragments that are associated with the game play stage. At least some of the video fragments have a plurality of different video takes that represent the same video fragment. The second set of video fragments includes a game outcome (result) video fragment. The game outcome video fragment includes a plurality of different video takes that represent different game outcomes (results).

2. A first seamless, ordered string of stitched video fragments is created using the first set of video fragments for presentation to players during the betting stage. The first set of video fragments are selected using a Random Number Generator (RNG). More specifically, the RNG is used to select one of the video takes for each of the first set of video fragments that have a plurality of different video takes that represent the same video fragment. (STEP 102)

3. Upon conclusion of the betting stage, the RNG is used to select the outcome of the game. Since this step does not occur until the conclusion of the betting stage, the outcome of the game is therefore not known during the betting stage. (STEP 104)

4. A second seamless, ordered string of stitched video fragments is created using the second set of video fragments for presentation to players during the game play stage. The second set of video fragments are also selected using the RNG. More specifically and similar to process used in the betting stage, the RNG is used to select one of the video takes for each of the second set of video fragments that have a plurality of different video takes that represent the same video fragment. For the second seamless, ordered string of stitched video fragments, the video take that is selected for the video fragment associated with the game outcome is determined by the RNG which selected the outcome of the game in step 3 above. (STEP 106)

5. Combine the first and second seamless, ordered string of stitched video fragments to provide the video presentation that simulates the broadcasted game of chance. (STEP 108)

In one preferred embodiment, the RNG is a pseudorandom number generator (pRNG), also known as a deterministic random bit generator (DRBG). More specifically, the pRNG may be a Mersenne Twister general-purpose pRNG, such as a version of the Mersenne Twister algorithm based on the Mersenne prime $2^{19937}$, also referred to herein as "MT 19937."

In one preferred embodiment, the broadcasted game of chance is a live broadcasted game of chance.

In one preferred embodiment that is described in more detail below, the video fragments for the betting stage are dynamically assembled as a multimedia playlist file (m3u8 file), and the video fragments associated with the game play stage are appended to the multimedia playlist file after being selected in step 4 above.

In one preferred embodiment, the broadcasted game of chance is a live broadcasted game of chance.

To provide the appearance of an actual game of chance, the video fragments selected for the betting and game play stages are preferably associated with the same croupier. That is, the croupier is preferably not switched when transitioning from the betting stage to the game play stage. To facilitate this feature, video files associated with the same croupiers may be stored together.

III. DETAILED DISCLOSURE

The detailed disclosure below is described in the context of a spin-type game of chance, such as a spinning wheel or a roulette wheel, and a croupier for overseeing the game of chance. However, it should be understood that any game of chance with random outcomes may employ similar processes.

A. Selection of Outcome of a Particular Spin

As discussed above, the pRNG may use the Mersenne Twister MT 19937. This provides the system with a reliable source of cryptographically secure entropy. It provides interfaces for drawing random numbers in a suitable range for the consuming game. For example, in the case of a single zero roulette wheel, the pRNG would provide random numbers in the range 0-36 inclusive. The pRNG determines the game result and is also used to select fragments of video scenes during assembly of game-cycle videos played by the client video player component that is embedded within a browser user interface.

B. Controller that Stitches Together a Particular Sequence (Seamless, Ordered String of Stitched Video Fragments)

The controller is responsible for scheduling and resulting events. An event has a predefined period between the preamble and the show of a result, between which, a player is afforded an opportunity to place a wager. From a system perspective these are simple timings which control the process of defining an event, acceptance of wagers, resulting events, and settling wagers, all of which are pushed into the main bet management system.

From a player's perspective, the entertainment aspect of the game comes from the visually stimulating elements of the video stream, e.g., from the entertaining preamble through to observing the wheel slow to a stop, and finally, revealing the winning numbers.

The controller interfaces into several other components such that a pseudo-unique video can be assembled and rendered through a custom wrapper around a common web-based video player.

The controller includes a Croupier Scheduling Service that allows several croupiers (for which video scenes were previously created) to be configured into a rostering system. The service allocates croupiers to virtual casino game tables on an availability basis. Rulesets are configured such that availability models realistic scenarios. For example, a croupier cannot be available for more than one table and a croupier is available for realistic time periods—including giving scheduled breaks. This service ensures that while all video is pre-generated, a pseudorealistic experience is maintained. The service exposes an API to the controller which returns the Identifiers of the scheduled croupier for the given table which the controller is driving.

The controller also includes a Playlist Service which exposes an API to the controller which returns an ordered list of video fragments where each fragment is randomized across the available fragments for that section of the game cycle. The service may be configured to support any number of varying cuts of each fragment of a given casino game. In the returned data structure, each element references the video fragment in the video store.

Table 1 below is example that shows the assembly of a complete game cycle which is made up of fragments taken from many cuts of the same scene.

TABLE 1

| Croupier 1 | | | | | |
|---|---|---|---|---|---|
| Fragment-1 | Fragment-2 | Fragment . . . | Fragment . . . | Fragment . . . | Result |
| Cut 9 | Cut 17 | Cut 11 | Cut 3 | Cut 9 | Pos 17 |

C. Example of how to Stitch Together a Particular Sequence so as to Achieve a Particular Outcome The Video Store is a prepopulated cache of video fragments split at predetermined stages of a game cycle. There is a cache of videos for each croupier. With multiple cuts of the same scene, and with only slight variation between each cut, it becomes possible to assemble video fragments in a predefined order where each fragment does not necessarily need to come from the same cut of the scene.

Using the example from Table 1 above, the data structure returned from the Playlist Service can also be returned formatted as a dynamic m3u8 file. A video player component that is embedded within the browser user interface, and which is capable of rendering videos described through a m3u8 formatted file, digests the output from the Playlist Service.

An important feature of the present invention is the ability to assemble the m3u8 file dynamically, such that at start of the video, the end of the video is not available, hence the result is unknown. This means that the gaming system can accept wagers while the preamble is playing but until wagering is closed, no part of the system has knowledge of the result. During the resulting phase, the m3u8 file is appended with references to the video segment responsible for rendering the final position of a wheel, or whatever gaming outcome indicia or object is relevant. Using this real-time assembly of video segments, and real-time assembly of the m3u8 file, game cycles can be extended to support dynamic in-game features and bonuses.

D. Sample System Component Diagram

Figure 2:
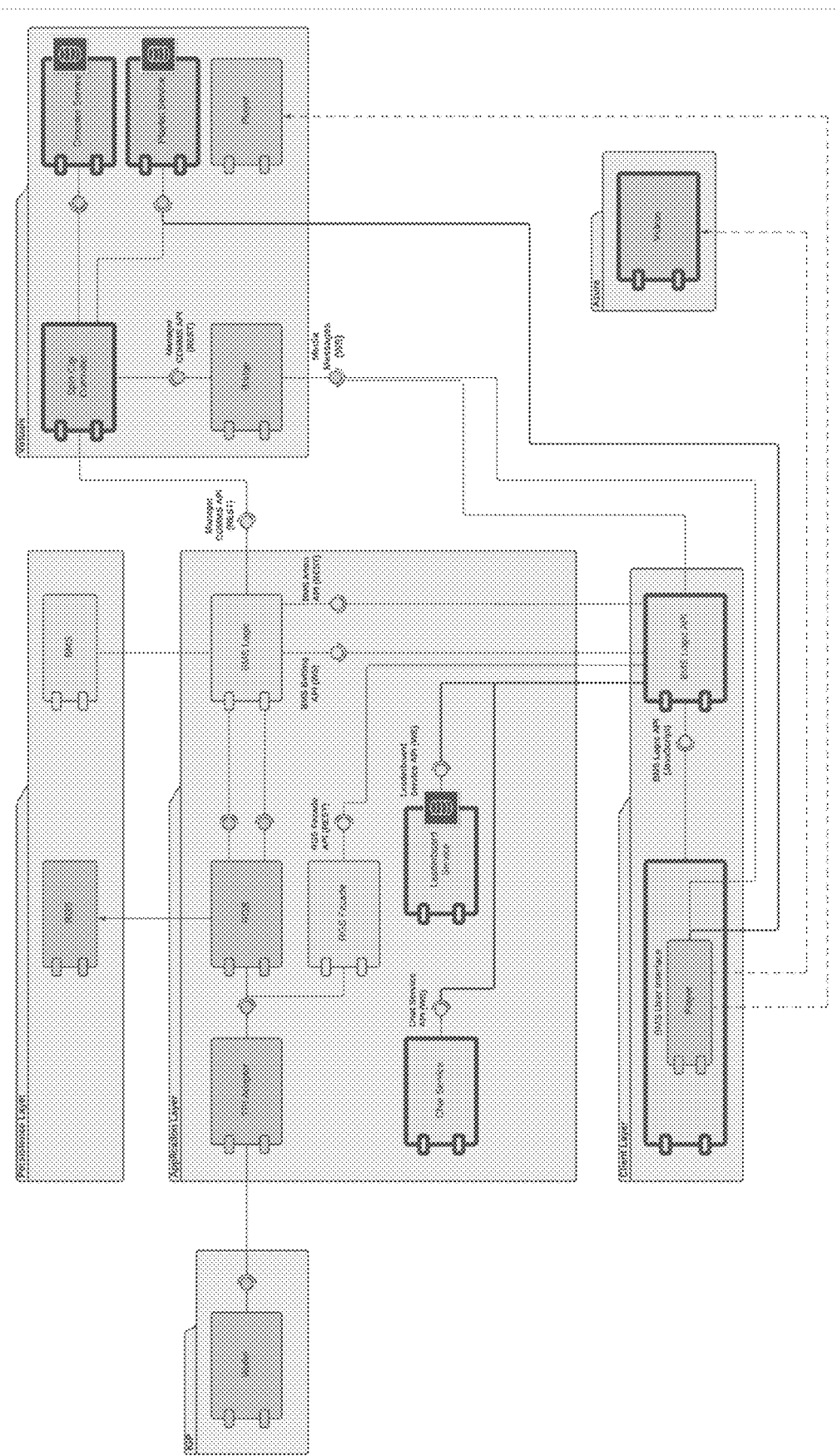
FIG. 2 is a system architecture view of one preferred embodiment of the present invention.
Figure 3:
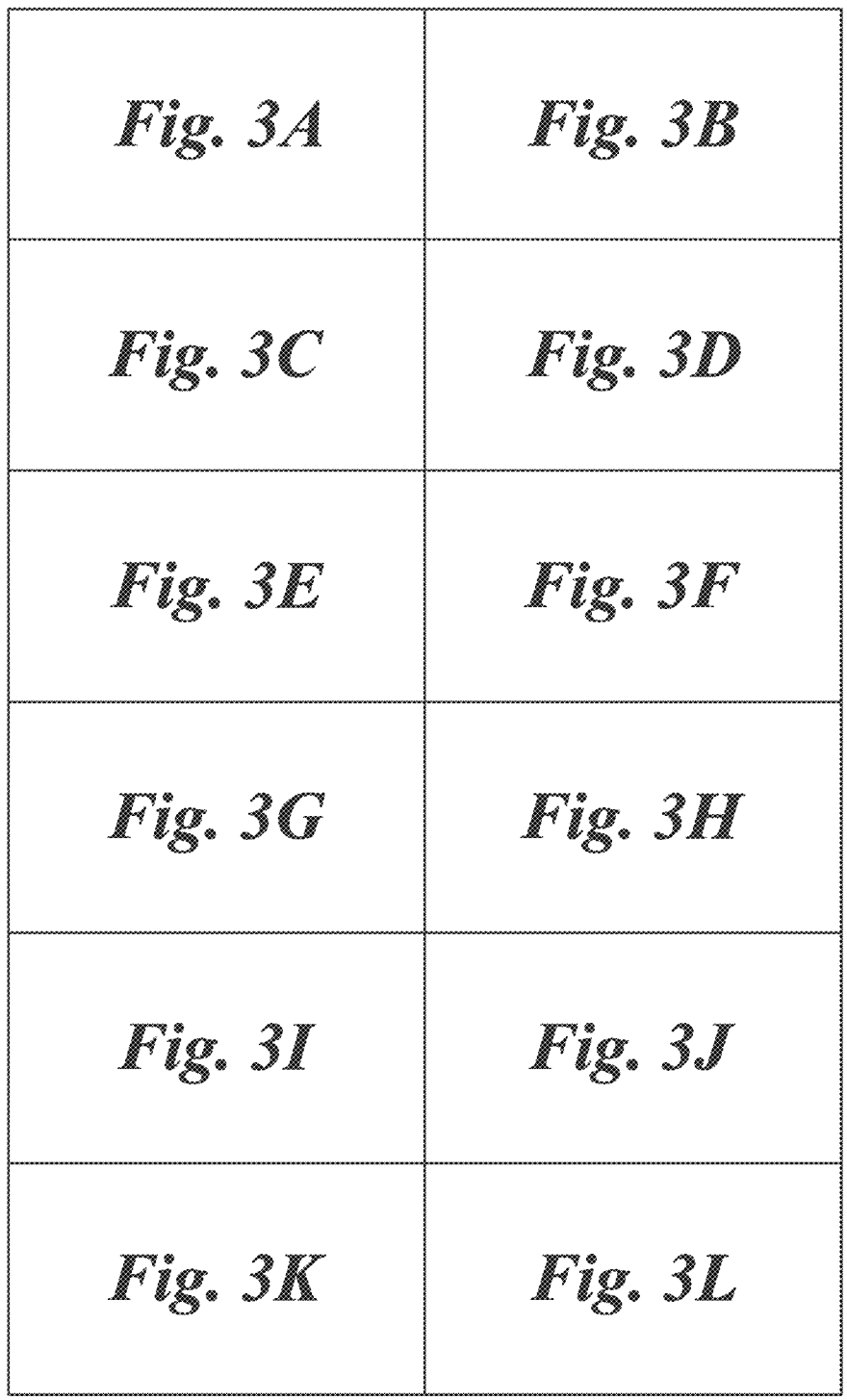
Figure 3A:
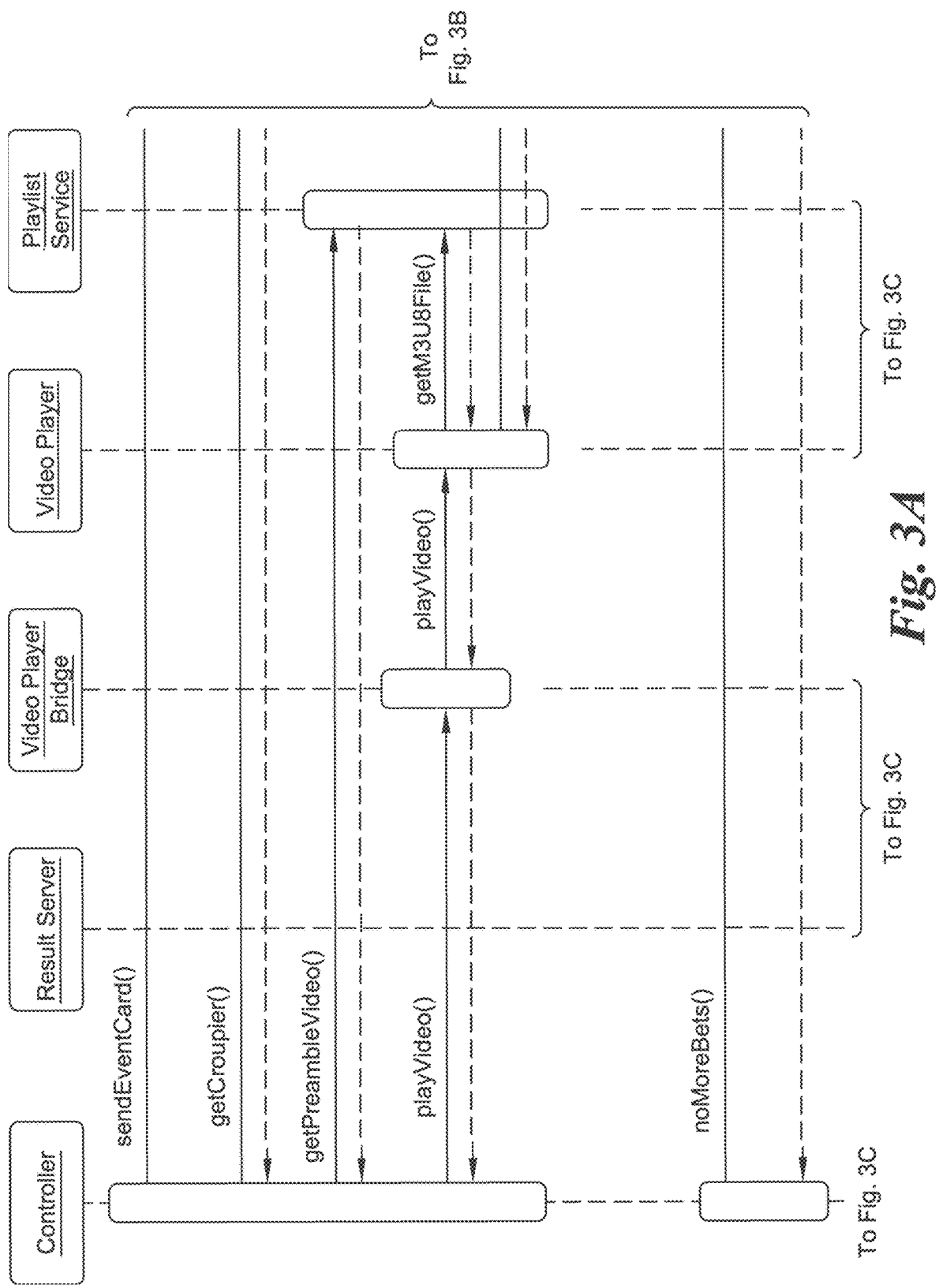
Figure 3B:
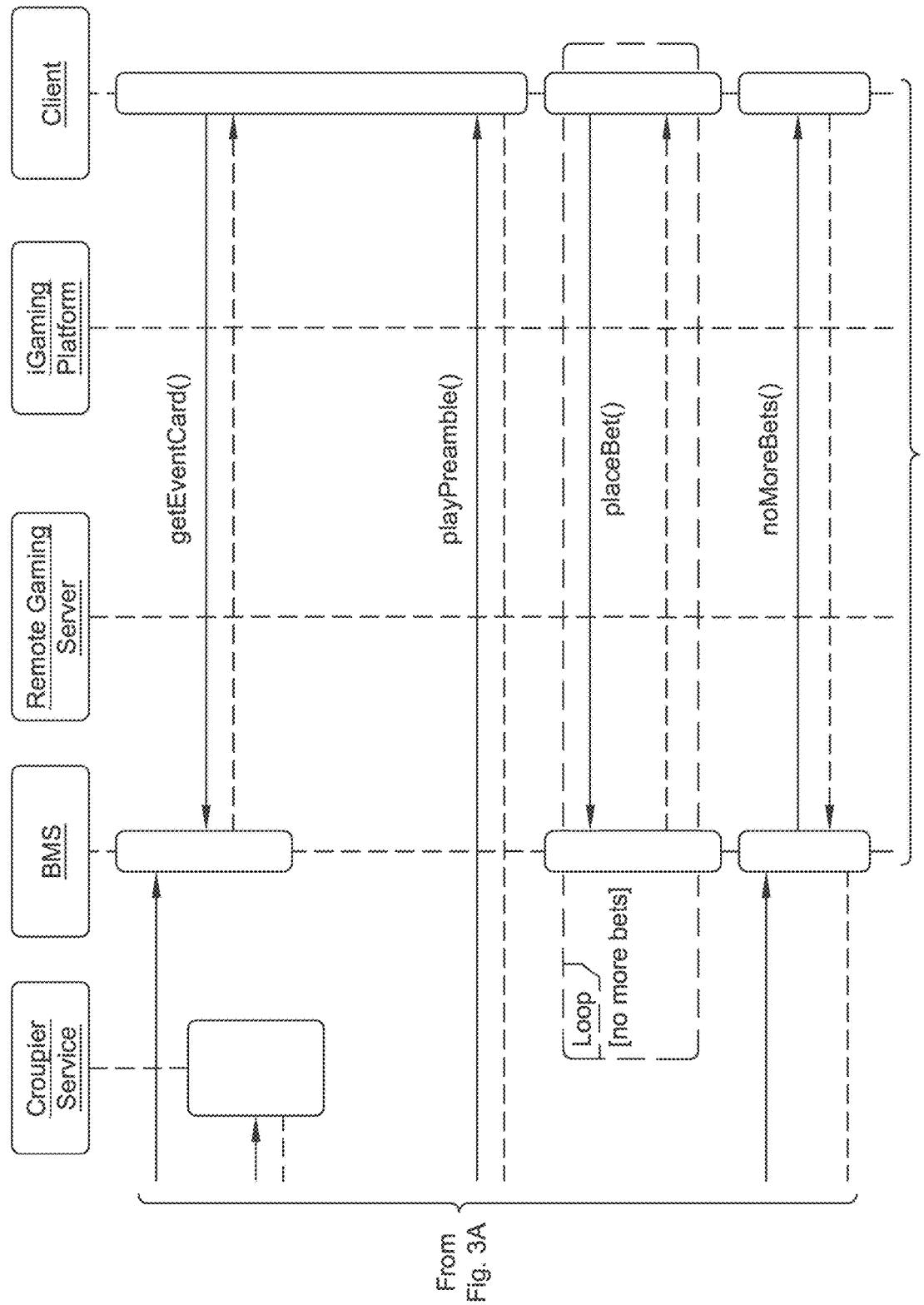
Figure 3E:
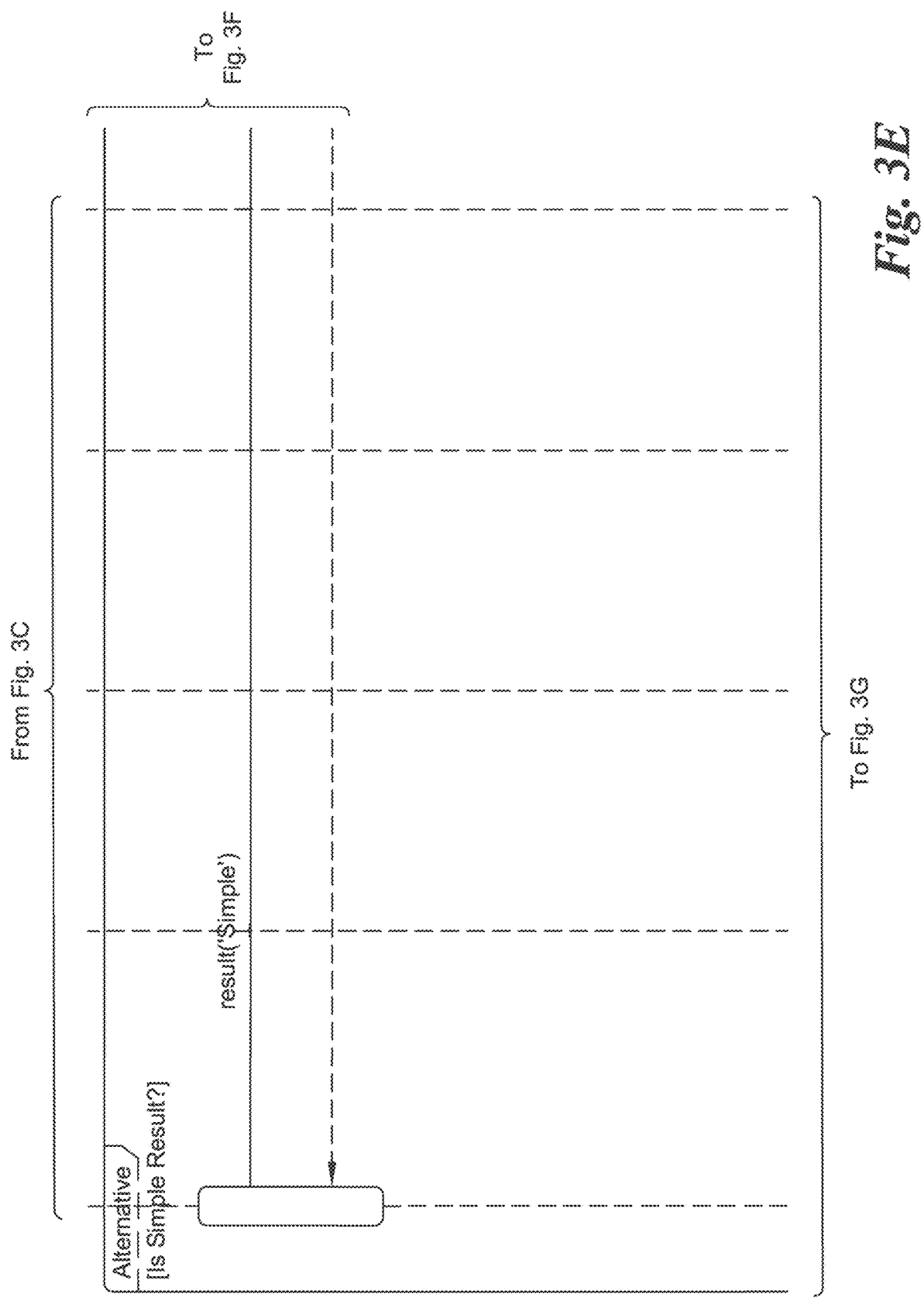
Figure 3F:
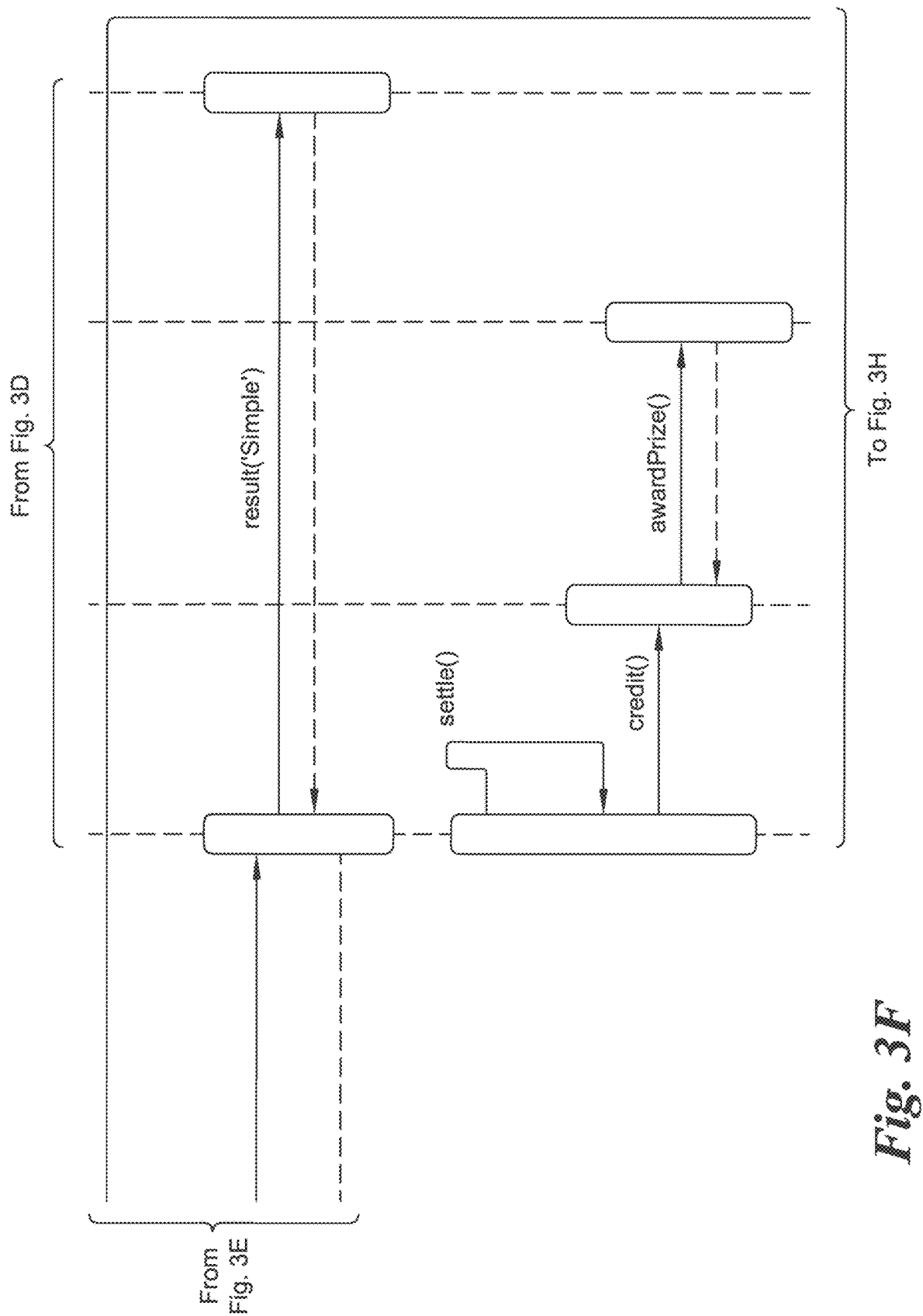
Figure 3H:
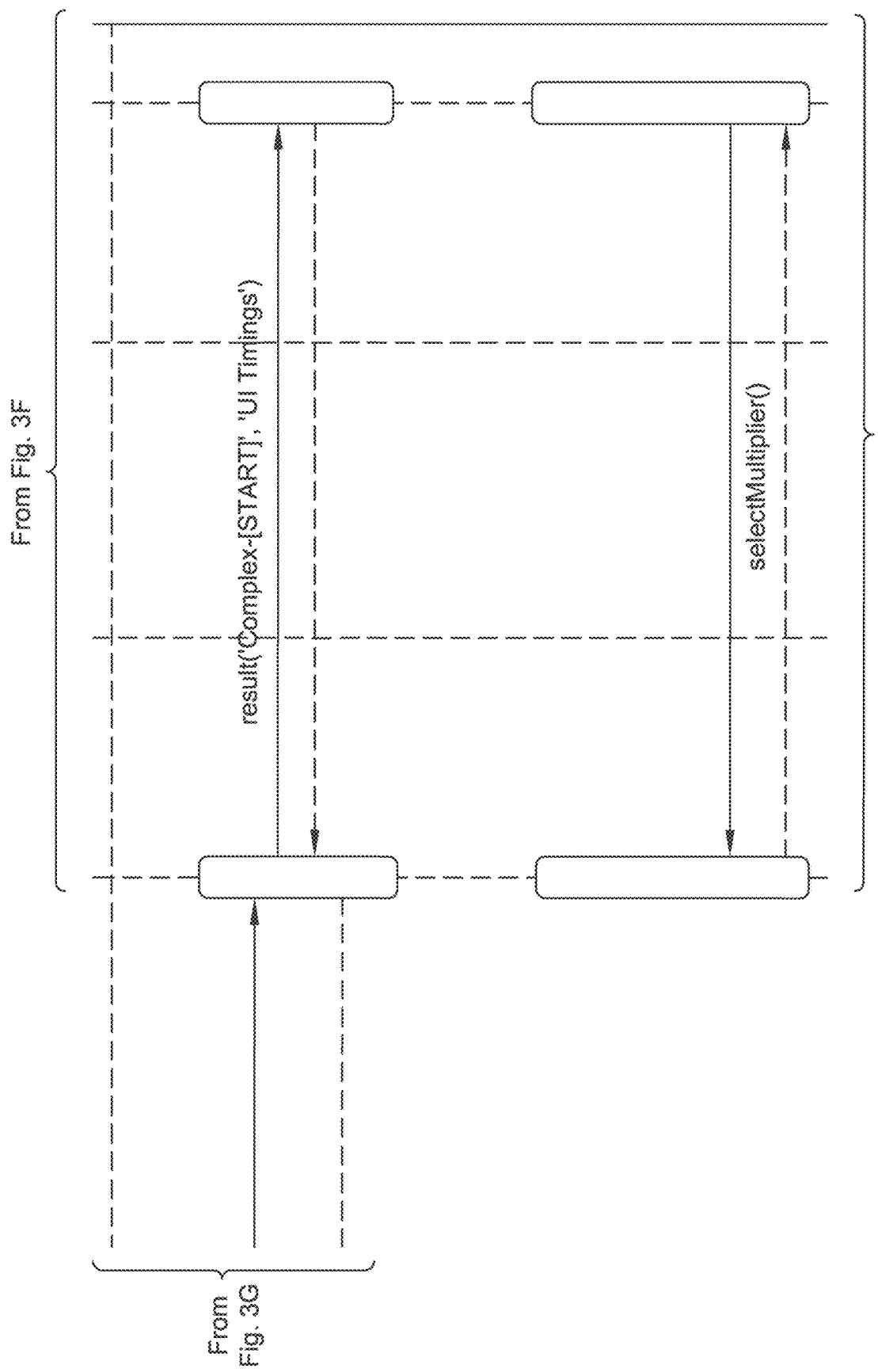
Figure 3J:
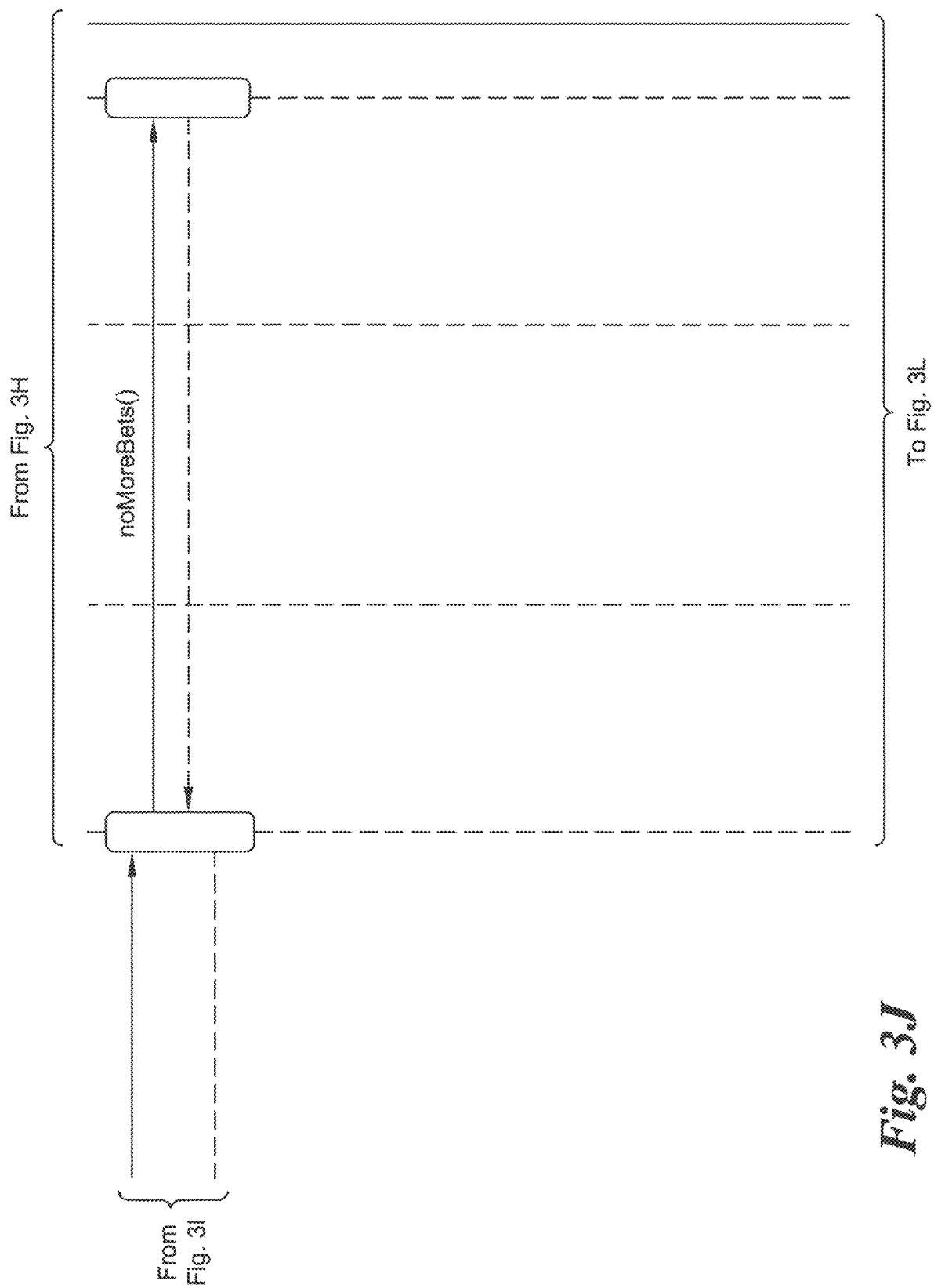
Figure 3K:
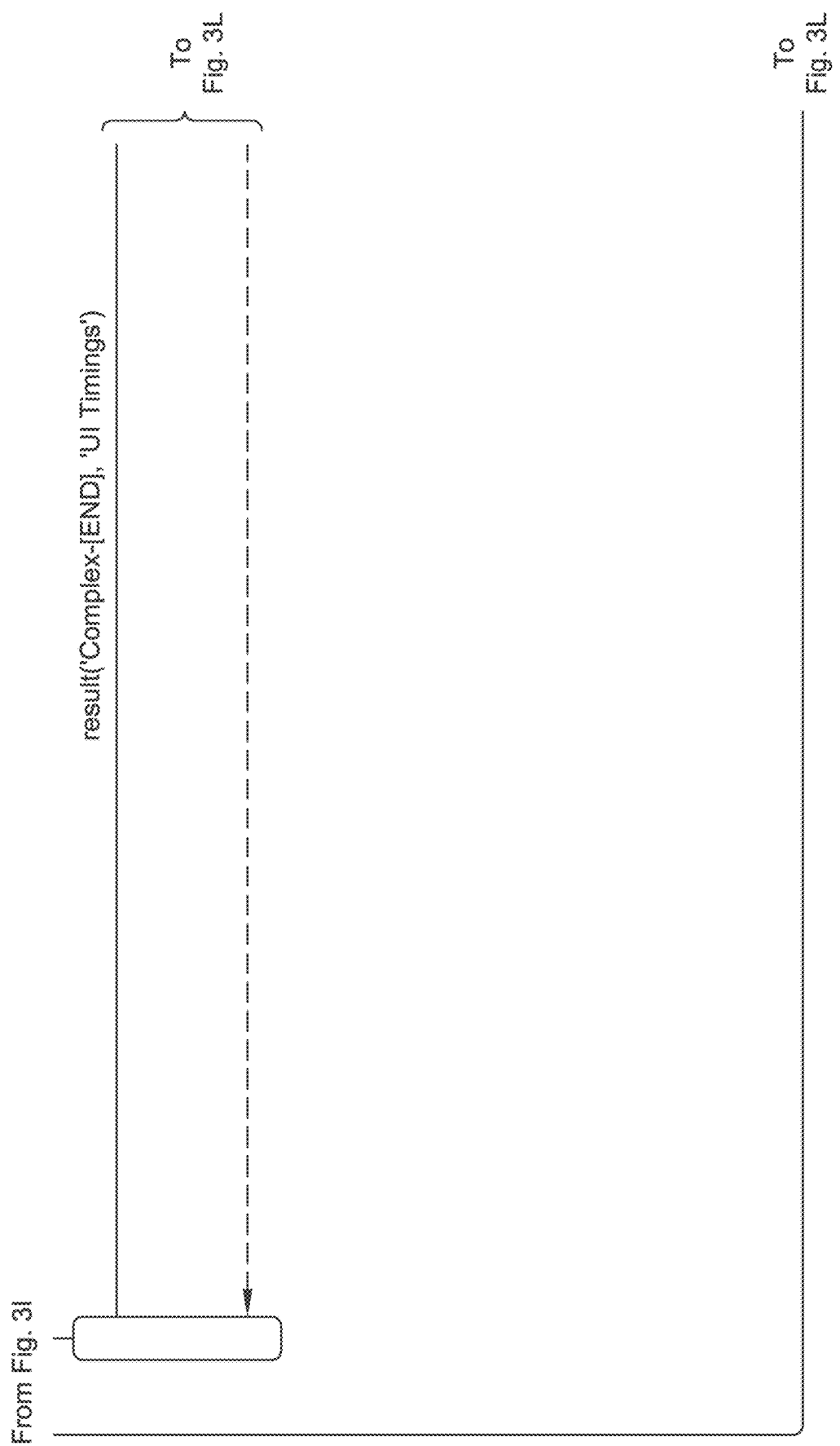
Figure 3L:
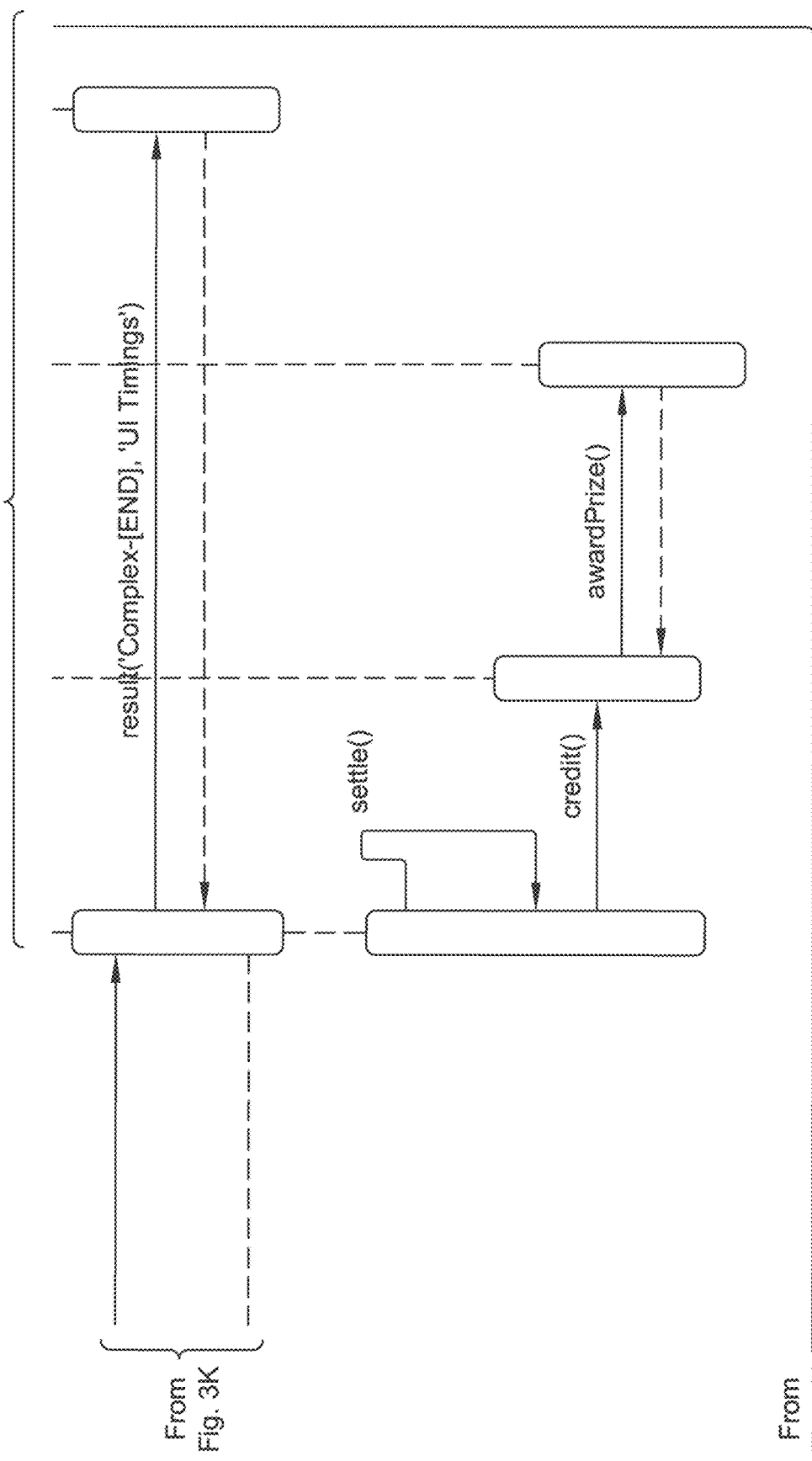

FIG. 2 is a system 200 component diagram that illustrates the architecture of system interfaces and interactions for a sample game of chance called "Spin City" that uses a spinning wheel. The system 200 includes at least the following components:

202: iGaming Platform that includes a wallet
204: Persistence Layer including:
    i. Remote Gaming Server (RGS) Database
    ii. Bet Management System (BMS) Logic Database
206: Application Layer including:
    i. Gaming Standards Association's Third Party Interface (TPI) Adapter
    ii. BMS
    iii. BMS Logic
    iv. BMS Façade
    v. Chat Service
    vi. Leaderboard Service
208: Client Layer including:
    i. BMS User Interface for the Player
    ii. BMS Logic API
210: Virtuals including:
    i. Spin City Controller
    ii. Bridge
    iii. Croupier Service
    iv. Playlist Service
    v. Player
212: Azure which stores the video files E. Sample Multimedia Playlist File (m3u8 File)
    Part 1 of the Appendix shows sample source code that demonstrates how a m3u8 file is assembled using the RNG to randomize the fragment selection.
    Part 2 of the Appendix shows an actual m3u8 file generated from the sample source code in Part 1.

F. Sequence Diagram Example
    FIG. 3 and FIGS. 3A-3L, taken together, show a self-explanatory sequence diagram for "Spin City."

G. Sample Media Filesystem Structure
    FIGS. 4 and 5 show two different views of a sample media filesystem structure. More specifically, the images in these two figures demonstrate the logical filesystem layout for storing is fragments for assembling m3u8 files. In one preferred embodiment, a file system in Azure is used.

H. Sample Decision Tree for RNG

FIG. 6 demonstrates how the m3u8 file is assembled based on a random selection through a decision tree. The decision tree shows both the permutations of a composite m3u8 file (and hence fully assembled video) and an example of a pathway through that tree. The tree shown has ~148 million unique paths and therefor the same number of potential complete videos.

IV. ADDITIONAL CONSIDERATIONS

A. Additional Stages of the Game of Chance

In addition to a betting stage and a game play stage as discussed above, there may be multiple additional stages of betting, as well as additional game play stages, such as one or more bonus games.

B. Partial Rendering of Video Fragments

In one alternative embodiment, one or more of the stored video fragments are partially rendered video fragments. Rendering is then completed to create a fully rendered video fragment when the respective video fragment is selected for the first or second seamless to create the ordered string of stitched video fragments. This process may be performed in a manner similar to the process of partially rendering video segments, described in U.S. Pat. No. 10,210,700 (Metelko et al.) and U.S. Pat. No. 10,322,339 (Metelko et al.), both of which are incorporated herein by reference.

C. Software Code Implementation

The present invention may be implemented with any combination of hardware and software. If implemented as a computer-implemented apparatus, the present invention is implemented using means for performing all of the steps and functions described above.

When implemented in software, the software code for implementing the source described above can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for forming clusters of data records, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

APPENDIX

Part 1 - Sample source code that demonstrates how a m3u8 file is assembled using the RNG to randomize the fragment selection

```
package com.ingg.hybrid;
import java.io.IOException; import java.util.Arrays; import java.util.Random;
public class HybridCasinoM3U8 {
public static int WHEEL_SEGMENTS = 38; public static int WHEEL_SEGMENT_FRAGS =
10; public static int SPIN_FRAGS = 5;
public static int PB_PHASES=3; public static int PB_FRAGS=3; public static int
FB_PHASES=3; public static int FB_FRAGS=3; public static int NMB_FRAGS=3;
private static Random RNG = new Random(System.currentTimeMillis( ));
public static void main(String[ ] args) throws IOException {
int[ ] rns = notRecentlyUsedInts( );
System.out.println(getM3U8Phase1("Croupier-2", rns)); System.out.println("wait before
appending.  ");
System.out.println( );
System.out.println(getM3U8Phase2("Croupier-2", RNG.nextInt(WHEEL_SEGMENTS)+1));
}
public static int[ ] notRecentlyUsedInts( ){
int[ ] ints = {
RNG.nextInt(PB_FRAGS)+1, RNG.nextInt(PB_FRAGS)+1, RNG.nextInt(PB_FRAGS)+1,
RNG.nextInt(FB_FRAGS)+1, RNG.nextInt(FB_FRAGS)+1, RNG.nextInt(FB_FRAGS)+1,
RNG.nextInt(SPIN_FRAGS)+1, RNG.nextInt(NMB_FRAGS)+1
};
return ints;
}
public static String getM3U8Phase1(String croupier, int[ ] rns){ StringBuffer sb = new
StringBuffer( ); sb.append("#EXTM3U\n");
sb.append("#EXT-X-VERSION:3\n"); sb.append("#EXT-X-TARGETDURATION:4\n");
sb.append("#EXT-X-MEDIA-SEQUENCE:0\n");
int step = 0;
// Place bets...
for(int i = 0;i<=PB_PHASES;i++) { sb.append("#EXTINF:3,\n");
sb.append("wss://hc.inseinc.com/hc-media/" + croupier + "/PB-"+i+"/pb-frag-"+i+"-" + rns[step]
+ ".ts\
n");
ts\n");
}
// Finish betting...
for(int i = 1;i<=FB_PHASES;i++) { sb.append("#EXTINF:3,\n");
sb.append("wss://hc.inseinc.com/hc-media/" + croupier + "/FB-"+i+"/fb-frag-"+i+"-" +
rns[step++] + ".
ts\n");
}
}
// Spin the wheel...
sb.append("#EXTINF:2,\n");
sb.append("wss://hc.inseinc.com/hc-media/" + croupier + "/SPIN-WHEEL/spin-wheel-frag-" +
rns[step++] + ".
// No more bets...
sb.append("#EXTINF:6,\n");
sb.append("wss://hc.inseinc.com/hc-media/" + croupier + "/NMB/nmb-frag-" + rns[step++] +
".ts\n"); return sb.toString( );
public static String getM3U8Phase2(String croupier, int result){ StringBuffer sb = new
StringBuffer( );
// Spin the wheel...
sb.append("#EXTINF:3,");
sb.append("\n");
sb.append("wss://hc.inseinc.com/hc-media/" + croupier + "/BALL_DROP/gb-frag-" +result+
"/"+(RNG.nextInt( WHEEL_SEGMENT_FRAGS) + 1) + ".ts");
sb.append("\n"); sb.append("#EXT-X-ENDLIST");
sb.append("\n");
return sb.toString( );
}
}
```

Part 2 - Actual m3u8 file generated from code in Part 1

```
#EXTM3U
#EXT-X-VERSION:3
#EXT-X-TARGETDURATION:4
#EXT-X-MEDIA-SEQUENCE:0
#EXTINF:3,
wss://hc.inseinc.com/hc-media/Croupier-2/PB-1/pb-frag-1-3.ts
#EXTINF:3,
wss://hc.inseinc.com/hc-media/Croupier-2/PB-2/pb-frag-2-2.ts
```

APPENDIX-continued

```
#EXTINF:3,
wss://hc.inseinc.com/hc-media/Croupier-2/PB-3/pb-frag-3-2.ts
#EXTINF:3,
wss://hc.inseinc.com/hc-media/Croupier-2/FB-1/fb-frag-1-2.ts
#EXTINF:3,
wss://hc.inseinc.com/hc-media/Croupier-2/FB-2/fb-frag-2-3.ts
#EXTINF:3,
wss://hc.inseinc.com/hc-media/Croupier-2/FB-3/fb-frag-3-1.ts
#EXTINF:2,
wss://hc.inseinc.com/hc-media/Croupier-2/SPIN-WHEEL/spin-wheel-frag-5.ts
#EXTINF:6,
wss://hc.inseinc.com/hc-media/Croupier-2/NMB/nmb-frag-1.ts
wait before appending....
#EXTINF:3,
wss://hc.inseinc.com/hc-media/Croupier-2/BALL_DROP/gb-frag-29/7.ts
#EXT-X-ENDLIST
END OF APPENDIX
```

What is claimed is:

1. A method for creating a plurality of different video presentations that simulate a broadcasted game of chance, wherein the game of chance has a plurality of successive stages, including (i) a betting stage during which players enter bets for the game of chance, and (ii) a game play stage, the game play stage beginning at the end of the betting stage and ending with a game outcome, the method comprising:

(a) storing in a memory a plurality of video fragments associated with a game of chance, the video fragments including a first set of video fragments that are associated with the betting stage, and a second set of video fragments that are associated with the game play stage, wherein at least some of the video fragments have a plurality of different video takes that represent the same video fragment, the second set of video fragments including a game outcome video fragment, the game outcome video fragment including a plurality of different video takes that represent different game outcomes;

(b) creating, by a controller, a first seamless, ordered string of stitched video fragments using the first set of video fragments for presentation to players during the betting stage, wherein the first set of video fragments are selected using a Random Number Generator (RNG), the RNG being used to select one of the video takes for each of the first set of video fragments that have a plurality of different video takes that represent the same video fragment;

(c) upon conclusion of the betting stage, using the RNG to select the outcome of the game, the outcome of the game thereby not being known during the betting stage;

(d) creating, by the controller, a second seamless, ordered string of stitched video fragments using the second set of video fragments for presentation to players during the game play stage, wherein the second set of video fragments are also selected using the Random Number Generator (RNG), the RNG being used to select one of the video takes for each of the second set of video fragments that have a plurality of different video takes that represent the same video fragment, wherein the video take that is selected for the video fragment associated with the game outcome is determined by the RNG which selected the outcome of the game in step (c); and (e) combining, by the controller, the first and second seamless, ordered string of stitched video fragments to provide the video presentation that simulates the broadcasted game of chance, wherein the first set of video fragments and the second set of video fragments are distinct from one another.

2. The method of claim 1 wherein the RNG is a pRNG.

3. The method of claim 1 wherein at least some of the video takes are real-world recorded video.

4. The method of claim 1 wherein the video fragments for the betting stage are dynamically assembled as a multimedia playlist file (m3u8 file), wherein the video fragments associated with the game play stage are appended to the multimedia playlist file after being selected in step (d).

5. The method of claim 1 wherein the broadcasted game of chance is a live broadcasted game of chance.

6. The method of claim 1 wherein one or more of the stored video fragments are partially rendered, and the one or more stored video fragments are fully rendered when the respective video fragment is selected for the first or second seamless, ordered string of stitched video fragments.

7. An apparatus for creating a plurality of different video presentations that simulate a broadcasted game of chance, wherein the game of chance has a plurality of successive stages, including (i) a betting stage during which players enter bets for the game of chance, and (ii) a game play stage, the game play stage beginning at the end of the betting stage and ending with a game outcome, the apparatus comprising:

(a) a Random Number Generator (RNG);

(a) a memory configured to store a plurality of video fragments associated with a game of chance, the video fragments including a first set of video fragments that are associated with the betting stage, and a second set of video fragments that are associated with the game play stage, wherein at least some of the video fragments have a plurality of different video takes that represent the same video fragment, the second set of video fragments including a game outcome video fragment, the game outcome video fragment including a plurality of different video takes that represent different game outcomes;

(b) a controller configured to create a first seamless, ordered string of stitched video fragments using the first set of video fragments for presentation to players during the betting stage, wherein the RNG is configured to:

(i) select the first set of video fragments, (ii) select one of the video takes for each of the first set of video fragments that have a plurality of different video takes that represent the same video fragment, and (iii) upon conclusion of the betting stage, select the outcome of the game, the outcome of the game thereby not being known during the betting stage, and wherein the controller is further configured to:

(i) create a second seamless, ordered string of stitched video fragments using the second set of video fragments for presentation to players during the game play stage, wherein the second set of video fragments are also selected using the Random Number Generator (RNG), and wherein the RNG is further configured to:

(iv) select one of the video takes for each of the second set of video fragments that have a plurality of different video takes that represent the same video fragment, wherein the video take that is selected for the video fragment associated with the game outcome is determined by the RNG which selected the outcome of the game, and wherein the controller is further configured to:

(ii) combine the first and second seamless, ordered string of stitched video fragments to provide the video presentation that simulates the broadcasted game of chance, wherein the first set of video fragments and the second set of video fragments are distinct from one another.

8. The apparatus of claim 7 wherein the RNG is a pRNG.

9. The apparatus of claim 7 wherein at least some of the video takes are real-world recorded video.

10. The apparatus of claim 7 wherein the video fragments for the betting stage are dynamically assembled as a multimedia playlist file (m3u8 file), wherein the video fragments associated with the game play stage are appended to the multimedia playlist file after being selected.

11. The apparatus of claim 7 wherein the broadcasted game of chance is a live broadcasted game of chance.

12. The apparatus of claim 7 wherein one or more of the stored video fragments are partially rendered, and the one or more stored video fragments are fully rendered when the respective video fragment is selected for the first or second seamless, ordered string of stitched video fragments.

* * * * *